W. H. MOSHER.
TROLLEY FOR HOISTING APPARATUS, &c.
APPLICATION FILED MAR. 8, 1919.
1,312,417.
Patented Aug. 5, 1919.
2 SHEETS—SHEET 1.
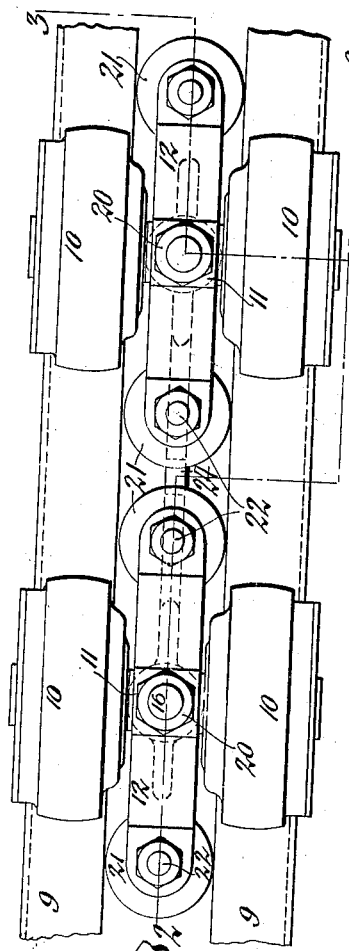
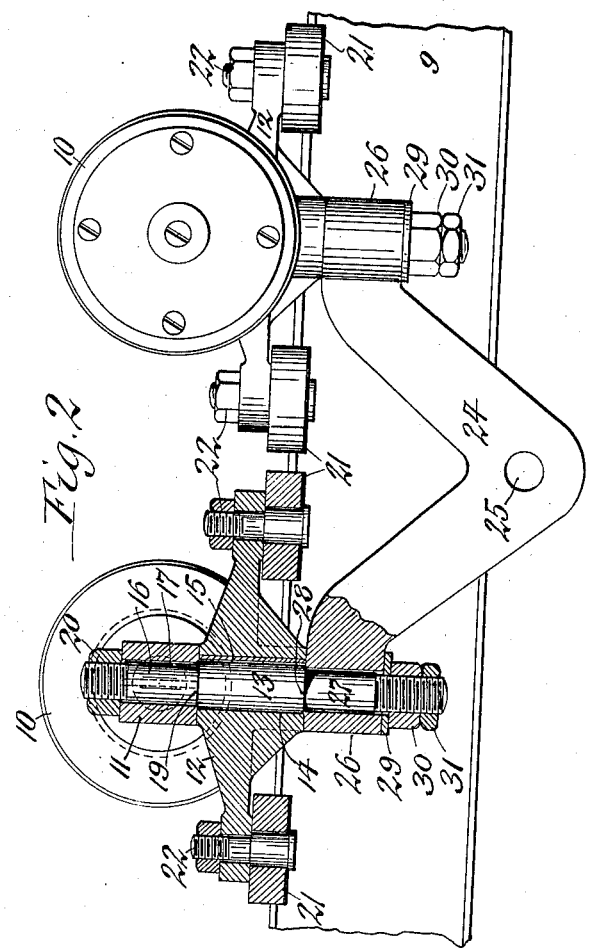
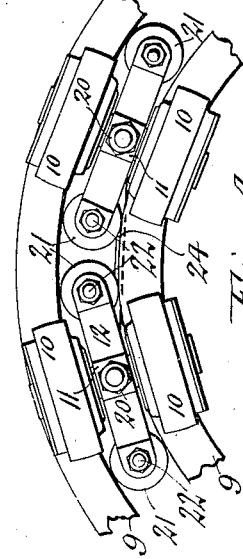
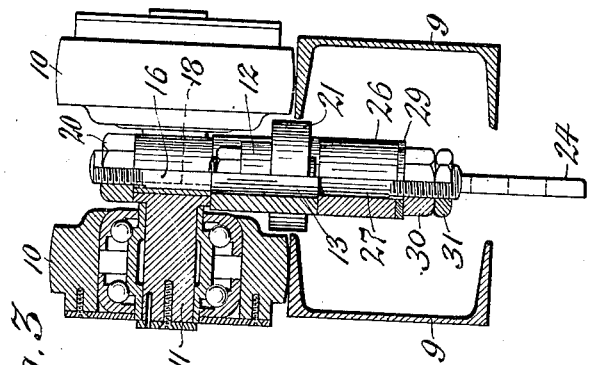

W. H. MOSHER.
TROLLEY FOR HOISTING APPARATUS, &c.
APPLICATION FILED MAR. 8, 1919.
1,312,417.
Patented Aug. 5, 1919.
2 SHEETS—SHEET 2.
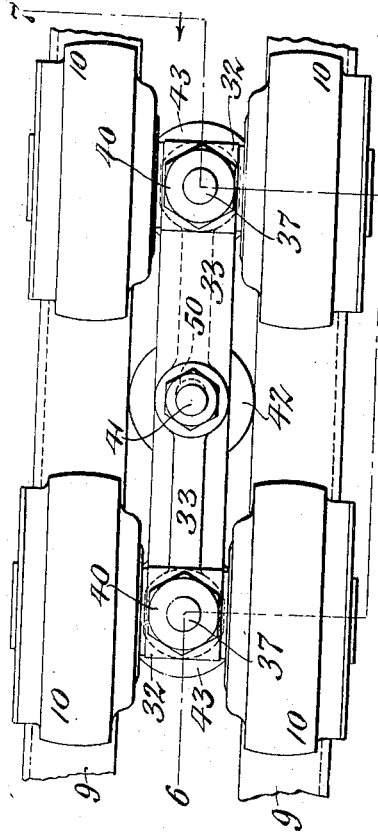
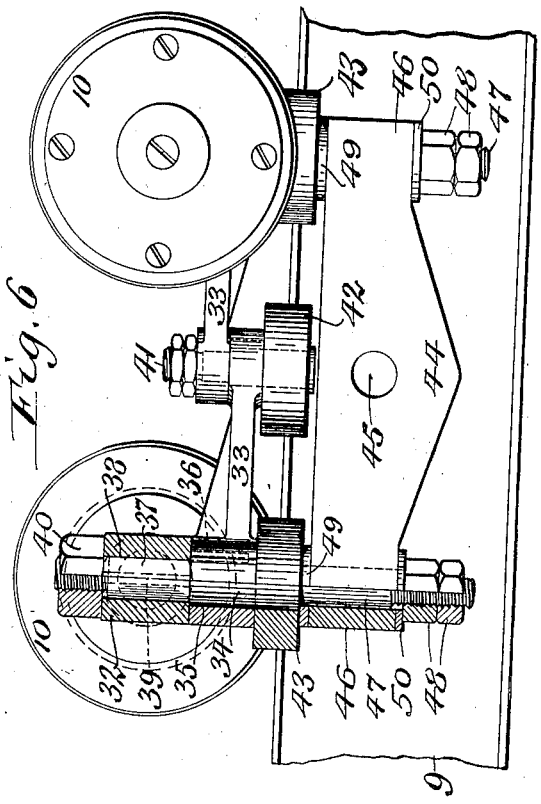
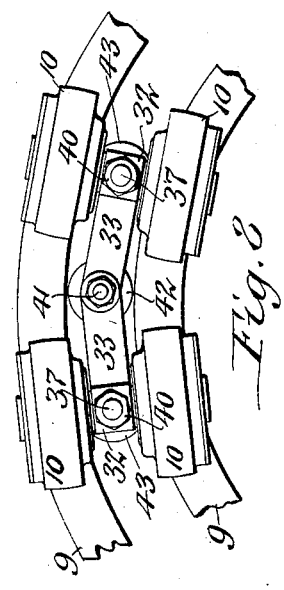
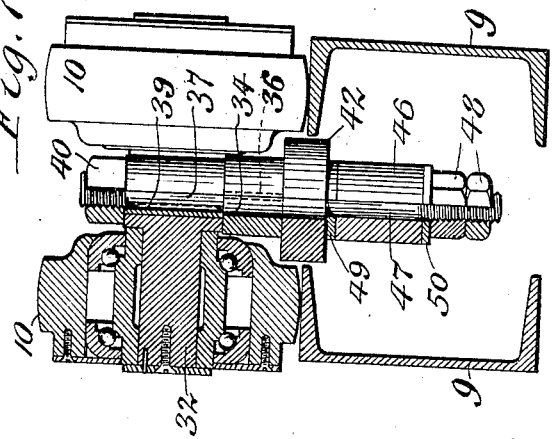

UNITED STATES PATENT OFFICE.

WILLET H. MOSHER, OF BUFFALO, NEW YORK, ASSIGNOR TO CUNDALL, POWELL & MOSHER, INC., OF BUFFALO, NEW YORK, A CORPORATION OF NEW YORK.

TROLLEY FOR HOISTING APPARATUS, &c.

1,312,417.  Specification of Letters Patent.  Patented Aug. 5, 1919.

Application filed March 8, 1919. Serial No. 281,397.

*To all whom it may concern:*

Be it known that I, WILLET H. MOSHER, a citizen of the United States, residing in Buffalo, in the county of Erie and State of New York, have invented new and useful Improvements in Trolleys for Hoisting Apparatus, &c., of which the following is a specification.

This invention relates to a trolley which is more particularly designed for use as a part of an overhead hoisting system in manufacturing establishments for transporting articles from one place to another, although the same may also be employed to advantage in other installations.

The trolleys for this purpose as heretofore constructed were objectionable inasmuch as the same required an unduly great amount of power for moving them, particularly when turning a curved portion of the track where the wheels would tend to bind or cramp, and they were also faulty in that the same were liable to be strained by the load suspended therefrom and thereby produce undue wear and necessitate frequent repairs or adjustment of the parts.

It is the object of this invention to provide a trolley for hoisting and transporting apparatus which is comparatively simple, durable and inexpensive in construction, which will support the load easily without unduly straining any of the parts, and which will run as easily around curves as on straight portions of the track without any binding or cramping action or producing friction, thus enabling the trolley to be moved easily and freely and with a minimum of expenditure of power.

In the accompanying drawings:

Figure 1 is a top plan view of one form of trolley constructed in accordance with my invention and showing the same running on a straight portion of a track. Fig. 2 is a vertical longitudinal section of the same taken on line 2—2, Fig. 1. Fig. 3 is a vertical transverse section thereof taken on line 3—3, Fig. 1. Fig. 4 is a top plan view of this trolley, on a reduced scale, and showing the same running on a curved portion of the track. Fig. 5 is a top plan view of a modified form of trolley embodying my invention. Fig. 6 is a longitudinal section of the same taken on line 6—6, Fig. 5. Fig. 7 is a vertical transverse section thereof, taken on line 7—7, Fig. 5. Fig. 8 is a top plan view, on a reduced scale, showing the form of trolley illustrated in Figs. 5-7 running on a curved portion of the track.

Similar characters of reference refer to like parts throughout the several views.

This trolley is more particularly designed to run on a track which is provided with a pair of rails 9, 9, which are arranged parallel or side by side, these rails in the form shown in the drawings being constructed of channel irons which have their webs arranged vertically and their upper and lower flanges projecting toward each other but separated by an intervening slot or longitudinal space. These rails may be supported either from the ground or from an overhead structure in any suitable and well known manner and no particular means are therefore illustrated for this purpose.

The form of trolley shown in Figs. 1-4 and containing one embodiment of my invention is constructed as follows:

As shown in these figures this trolley contains two trucks which are arranged adjacent to each other lengthwise of the track, each of these trucks including a pair of supporting wheels 10, 10 arranged axially in line transversely of the direction of movement of the trolley and running with their undersides on top of the upper flanges of the channel irons which form the rails of the track. The pair of wheels of each truck are journaled upon opposite ends of a horizontal transverse axle 11 the pivotal connection between each of these wheels and the axle being preferably produced by a rolling bearing, which as shown in the drawings, is of the ball type, but it is to be understood that these wheels may be mounted on this axle in any other suitable or approved manner, for instance, by means of roller bearings or plain bearings.

Arranged lengthwise below the central part of the axle of each truck is a tracker bar 12 which is rigidly secured midway of its length to the axle so that the opposite ends of this tracker bar forms arms projecting from opposite sides of the axle in a direction lengthwise of the track. The rigid connection between this tracker bar and the axle may be effected in various ways, for instance, as shown in the drawings this is accomplished by providing a vertical coupling pin or bolt with an enlarged central part 13 which is secured in a vertical opening 14 in the central part of the tracker bar by means of a key 15 which prevents these parts from turning relatively to each other while the upper reduced part 16 of this coupling pin engages with a vertical opening 17 in the central part of the adjacent axle and is rigidly held against turning therewith by means of a key 18 and also by clamping the axle between the shoulder 19 engaging with the underside of the axle and formed on the coupling pin between its upper reduced and central enlarged part, and a screw nut 20 arranged on the upper threaded end of this pin and engaging with the upper side of the axle. At their outer ends the arms of the tracker bar are provided with guiding members which are arranged in the slot formed between the rails of the track and thus cause the tracker bar to be shifted laterally in accordance with the direction of the track and thereby compel the wheels of the respective truck to run properly on the rails and with the least amount of friction. In the preferred form of these guide members the same consists of rollers 21 which have their axes arranged vertically and are pivotally mounted on the undersides of the outer end of the tracker arms by means of vertical pivot bolts 22 which have their upper ends secured to the tracker arms while the lower ends form journals upon which guide rollers turn. These guide rollers are of such a manner that they practically bridge the slot formed between the upper portions of the rails so that these rollers are compelled to follow the course outlined by the opposing inner sides of these rails. The arms of the tracker bar are preferably of the same length so that th guide rollers thereon are arranged at the same distance from the axle.

When therefore each truck is running on a straight portion of the track, as shown in Fig. 1, the engagement of the guide rollers with the inner sides of the rails causes the axle to be maintained in a true position transversely of the direction of movement of the truck so that the wheels of the same run accurately upon the rails and with a minimum of friction. Likewise when the truck is running around a curved portion of the track, as indicated in Fig. 4, the engagement of the guide rollers with the inner sides of the rails in front and in rear of the axle and the points equidistant therefrom, the axle is shifted horizontally relatively to the track so that the axle is always arranged on a radial line of the arc upon which the curved portion of a track is struck, thereby avoiding dragging of the trolley wheels on the rails and causing the same to run easily and with the least amount of friction.

In practice the trolley is preferably made up of two trucks of this character which are coupled in any suitable manner so that the load to be carried may be suspended therefrom. As shown in the drawings, this connection between the two trucks is preferably effected by means of a V-shaped yoke 24 which has its central depending part provided with an opening 25 for receiving the hoisting tackle or other means for attaching a load thereto while the opposite upper extremities of this yoke terminate in eyes 26, 26 each of which is journaled upon the reduced lower part 27 of the coupling pin of one of the trucks by engagement of the upper side of this eye with a downwardly facing shoulder 28 formed between the central enlarged and lower reduced part of the respective coupling pin, a washer 29 mounted on the lower end of this coupling pin and engaging with the underside of this yoke eye and two screw nuts 30, 31, mounted on the threaded lower end of this coupling pin and serving to hold this washer in place. As the two trucks of the trolley move lengthwise of the track either upon the straight portion, as shown in Fig. 1, or upon the curved portion thereof, as shown in Fig. 4, the load is suspended therefrom by means of the yoke which latter, by reason of its swiveling or pivotal connection with the trucks, turns horizontally relatively thereto and thereby adapts itself to the changing positions which the trucks assume relatively to each other while passing over either straight or curved portions of the track, thus avoiding any cramping or binding action as well as eliminating undue wear.

In the construction shown in Figs. 5–8, the central part of the axle 32 of each truck has rigidly secured thereto a tracker bar 33 which is constructed in the form of a single arm projecting lengthwise from one side thereof toward the other truck, this arm being secured preferably to the underside of the respective axle by means of a coupling bolt having an enlarged central part 34 which is secured in a vertical opening 35 in the outer end of the tracker arm by means of a key 36 while the upper reduced part 37 of this coupling pin is secured in a vertical opening 38 in the central part of this axle by means of a key 39 and a screw nut 40 applied to the upper end of this coupling pin and engaging with the upper side of this axle, thereby rigidly connecting this latter with the respective tracker arm and compelling the same to turn transversely together. The tracker arm of one truck in this case is arranged above that of the other truck and their inner ends overlap and are pivotally connected by means of an upright pivot pin or bolt 41. On the lower end of this pivot pin is mounted a guide member which is preferably constructed in the form of a roller 42 which turns on this pivot pin and is adapted to engage on its opposite sides with the opposing inner sides of the rails of the track on which the wheels 10 of these two trucks are mounted. Below the tracker arms 33 each of the coupling pins has rotatably mounted thereon a guide member constructed in the form of a roller 43 which also engages with the opposing inner sides of the track rails. The load to be carried by this trolley is in this case suspended from both trucks by means of a yoke 44 which is provided with a central opening 45 to receive the suspension or hoisting tackle, while its opposite ends are provided with eyes 46 each of which is journaled upon the lower reduced part 47 of one of the coupling pins and confined thereon by a pair of screw nuts 48 arranged on the lower threaded end of the respective coupling pin below the adjacent eye of the yoke. Washers 49, 50 are arranged between the upper and lower sides of each eye 46 and the adjacent guide roller 43 and screw nut 48, as best shown in Figs. 6 and 7. When a trolley of the construction shown in Figs. 5–8 runs upon a straight portion of the track, as shown in Fig. 5, the guide rollers 42, 43 by engaging with the opposing inner sides of the rails serve to hold the axles of the trucks in a position at right angles to the rails and thereby cause the trolley wheels to run properly and with a minimum amount of friction on the rails. When, however, the trolley runs on a curved portion of the track, as shown in Fig. 8, the guide roller 42 intermediate of the trucks causes the axles to be turned at an angle relatively to the rails so that these axles are approximately on a radial line relatively to the arc on which the curved portion of the track is struck and thereby reduces the drag of the trolley wheels on these rails and the friction resulting therefrom accordingly. In order to permit this lateral movement of the tracker arms 33 when this trolley passes over a curved part of the rails, a slack connection is provided between these arms, this being effected in the present case by enlarging the opening in one of the arms which receives the bolt 41, as shown by dotted lines 51 in Fig. 6.

By means of this invention it is possible to employ supporting wheels which are unprovided with flanges for retaining the same against lateral displacement on the rails, thereby avoiding the shearing action which such flanges produce on the rails and instead permit the supporting wheels to run freely, easily and without any appreciable friction.

This improved trolley is not only comparatively simple and durable in construction, but the same is also very efficient in operation and enables comparatively heavy loads to be transported easily and quickly.

I claim as my invention:

1. A trolley comprising a pair of wheels adapted to run on a pair of rails, a transverse axle upon opposite ends of which said wheels are mounted, and a tracker bar rigidly connected with said axle and provided at a distance from said wheels in a direction lengthwise of the rails with a guide member adapted to be arranged between said rails.

2. A trolley comprising a pair of wheels adapted to run on a pair of rails, a transverse axle upon opposite ends of which said wheels are mounted, a tracker bar rigidly connected with said axle and provided at a distance from said wheels in a direction lengthwise of the rails with a guide member adapted to be arranged between said rails, and a yoke suspended from said axle.

3. A trolley comprising a pair of wheels adapted to run on a pair of rails, a transverse axle upon opposite ends of which said wheels are mounted, and a tracker bar rigidly connected with said axle and provided at a distance from said wheels in a direction lengthwise of the rails with a guide roll adapted to be arranged between said rails.

4. A trolley comprising a pair of wheels arranged transversely in line and adapted to run on a pair of rails arranged side by side, a transverse axle on opposite ends of which said wheels are journaled, an upright coupling pin rigidly secured to said axle, and a tracker bar rigidly secured to said pin and provided with a guide member adapted to be arranged between said rails.

5. A trolley comprising a pair of wheels arranged transversely in line and adapted to run on a pair of rails arranged side by side, a transverse axle on opposite ends of which said wheels are journaled and which is provided between its ends with a vertical opening, a coupling pin having a reduced upper part keyed in said opening, an enlarged central part, and a reduced lower part, a screw nut arranged at the upper end of said coupling pin and engaging with the upper end of said axle, a tracker bar having a vertical opening in which the enlarged part of said coupling pin is keyed, a guide roller arranged on said tracker bar on one side of said axle and adapted to engage with the opposing inner sides of said rails, a yoke having an eye which turns on the lower reduced end of said coupling pin, and a screw nut arranged on the lower end of said coupling pin and engaging with the underside of said eye.

6. A trolley comprising a pair of wheels arranged axially in line and adapted to run on a pair of rails, an axle connecting said wheels, a tracker bar rigidly secured with its central part to said axle between said wheels and forming two arms projecting from opposite sides of said axle lengthwise of the direction of movement of said trolley, and guide members arranged at the outer extremities of said arms and adapted to be arranged between said rails.

7. A trolley comprising a pair of wheels arranged axially in line and adapted to run on a pair of rails, an axle connecting said wheels, a tracker bar rigidly secured with its central part to said axle between said wheels and forming two arms projecting from opposite sides of said axle lengthwise of the direction of movement of said trolley, and guide rollers projecting downwardly from the outer ends of said arms and adapted to engage with the opposing inner sides of said rails.

8. A trolley comprising a pair of wheels arranged axially in line and adapted to run on a pair of rails, an axle connecting said wheels, a tracker bar rigidly secured with its central part to said axle between said wheels and forming two arms projecting from opposite sides of said axle lengthwise of the direction of movement of said trolley, guide members arranged at the outer extremities of said arms and adapted to be arranged between said rails, and a yoke pivotally connected with the tracker bar so as to be capable of swinging horizontally thereon.

9. A trolley comprising two trucks each of which includes a pair of wheels adapted to run on a pair of rails, a transverse axle on which said wheels are mounted, and a tracker bar rigidly connected with said axle and provided with a guide member adapted to be arranged between said rails, and a yoke having a pivotal connection with both trucks so as to swing horizontally relatively thereto.

10. A trolley comprising two trucks each of which includes a pair of wheels adapted to run on a pair of rails, a transverse axle on which said wheels are mounted, a tracker bar rigidly connected with said axle and forming longitudinal arms on opposite sides thereof, guide rollers arranged on the outer ends of said arms and adapted to engage with the inner opposing sides of said rails, and a yoke arranged lengthwise below said trucks and pivotally connected at opposite ends therewith so as to be capable of turning horizontally relatively thereto.

WILLET H. MOSHER.

Copies of this patent may be obtained for five cents each, by addressing the "Commissioner of Patents, Washington, D. C."